(12) United States Patent
Stevens

(10) Patent No.: US 8,852,034 B2
(45) Date of Patent: *Oct. 7, 2014

(54) BASKETBALL BACKBOARD

(75) Inventor: Larry Stevens, Fruit Heights, UT (US)

(73) Assignee: Lifetime Products, Inc., Clearfield, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/270,149

(22) Filed: Oct. 10, 2011

(65) Prior Publication Data

US 2012/0028739 A1 Feb. 2, 2012

Related U.S. Application Data

(63) Continuation of application No. 12/828,643, filed on Jul. 1, 2010, now Pat. No. 8,033,935, which is a continuation of application No. 09/228,325, filed on Jan. 11, 1999, now Pat. No. 7,749,111.

(51) Int. Cl.
*A63B 63/08* (2006.01)

(52) U.S. Cl.
CPC .................................. *A63B 63/083* (2013.01)
USPC ........................................ 473/479; 473/481

(58) Field of Classification Search
USPC ................................. 473/479–485
See application file for complete search history.

(56) References Cited

U.S. PATENT DOCUMENTS

| | | | |
|---|---|---|---|
| 737,286 A | 9/1955 | Panagrossi | |
| 3,517,001 A | 6/1970 | Berger | |
| 3,561,633 A | 2/1971 | Morrison | |
| 3,650,808 A | 3/1972 | Gagnon | |
| 3,836,227 A | 9/1974 | Holmen | |
| 3,890,407 A | 6/1975 | Briggs | |
| 3,956,209 A | 5/1976 | Hamilton, Jr. et al. | |
| 4,143,088 A | 3/1979 | Favre et al. | |
| 4,195,639 A | 4/1980 | Lee | |
| 4,294,055 A | 10/1981 | Andresen | |
| 4,377,283 A | 3/1983 | Mahoney | |
| 4,422,893 A * | 12/1983 | Duchateau et al. | ........... 156/232 |
| 4,460,739 A | 7/1984 | Ashby | |

(Continued)

FOREIGN PATENT DOCUMENTS

| | | |
|---|---|---|
| CN | 2281819 Y | 5/1998 |
| GB | 737286 | 9/1955 |
| GB | 947237 | 1/1964 |

OTHER PUBLICATIONS

Webpage download, Technical Report #29, 1995,www.mmto.org/MMTpapers/pdfs/tr/tr29.pdf, 16 pages.*

(Continued)

*Primary Examiner* — Gene Kim
*Assistant Examiner* — M Chambers
(74) *Attorney, Agent, or Firm* — Maschoff Brennan

(57) ABSTRACT

A basketball backboard assembly and a method of making the backboard assembly are disclosed. The assembly includes a backboard frame structure and an acrylic backboard which are bonded together with a suitable elastomeric adhesive, providing adequate adhesion and flexibility. The elastomeric adhesive has a bond gap in the range from 2 to 2.5 mm. The adhesive is catalyzed to provide control of the set time in the range from about 5 minutes to 1 hour. A plurality of bond gap spacers are located between the frame bonding surface and the backboard bonding surface to provide the bond gap.

50 Claims, 1 Drawing Sheet

(56) References Cited

U.S. PATENT DOCUMENTS

| | | | |
|---|---|---|---|
| 4,478,415 A | 10/1984 | Shaffer | |
| 4,607,082 A | 8/1986 | McGinniss | |
| 4,667,007 A * | 5/1987 | Wengrovius et al. | 528/18 |
| 4,799,679 A * | 1/1989 | Obram | 473/486 |
| 4,826,196 A | 5/1989 | Kirkpatrick et al. | |
| 4,857,131 A | 8/1989 | Damico | |
| 4,931,125 A | 6/1990 | Volkmann | |
| 4,951,179 A | 8/1990 | Machida | |
| 5,096,981 A | 3/1992 | Traver | |
| 5,254,062 A | 10/1993 | Hoffman | |
| 5,323,576 A | 6/1994 | Gumpert et al. | |
| 5,420,196 A | 5/1995 | Lucas | |
| 5,432,007 A | 7/1995 | Naito | |
| 5,462,765 A | 10/1995 | Calhoun et al. | |
| 5,468,794 A | 11/1995 | Stein et al. | |
| 5,507,484 A | 4/1996 | van Nimwegen | |
| 5,550,271 A | 8/1996 | Stein | |
| 5,569,689 A | 10/1996 | Stein | |
| 5,605,955 A | 2/1997 | Hirai | |
| 5,647,400 A | 7/1997 | Jani et al. | |
| 5,647,939 A | 7/1997 | Gee et al. | |
| 5,655,674 A | 8/1997 | Holztrager | |
| 5,677,896 A * | 10/1997 | Nunes | 368/10 |
| 5,713,806 A * | 2/1998 | Teitgen et al. | 473/481 |
| 5,839,982 A * | 11/1998 | Hying et al. | 473/481 |
| 5,902,656 A | 5/1999 | Hwang | |
| 5,980,401 A | 11/1999 | Erlewine | |
| 6,004,231 A * | 12/1999 | Schickert et al. | 473/481 |
| 6,004,679 A | 12/1999 | Mitchell et al. | |
| 6,187,432 B1 | 2/2001 | Krish et al. | |
| 6,207,896 B1 * | 3/2001 | Toyomura | 174/58 |
| 6,312,777 B1 | 11/2001 | Smith | |
| 6,355,127 B1 | 3/2002 | Mahdi et al. | |
| 6,486,256 B1 | 11/2002 | Tarbutton et al. | |
| 6,846,893 B1 | 1/2005 | Sherman et al. | |
| 7,749,111 B1 * | 7/2010 | Stevens | 473/479 |
| 8,033,935 B2 * | 10/2011 | Stevens | 473/479 |
| 8,038,550 B2 * | 10/2011 | Stevens | 473/479 |
| 2002/0005457 A1 | 1/2002 | Lee et al. | |
| 2012/0028739 A1 * | 2/2012 | Stevens | 473/481 |
| 2012/0031558 A1 | 2/2012 | Stevens | |

OTHER PUBLICATIONS

Webpage download, DowCorning Products, Publication Date Unknown, http://krayden.com/tds/dow_se_1700_tds.pdf, 5 pages.*
Email Correspondence, BRuss, Feb. 27, 2013, 1 page.*
U.S. Appl. No. 13/275,174, filed Oct. 17, 2011, Stevens.
Request for Ex Parte Reexamination of U.S. Patent 7,749,111 filed with the USPTO by Russell Brands LLC on Sep. 14, 2012.
Request for Inter Partes Reexamination of U.S. Patent 8,033,935 filed with the USPTO by Russell Brands LLC on Sep. 14, 2012.
Request for Inter Partes Reexamination of U.S. Patent 8,038,550 filed with the USPTO by Russell Brands LLC on Sep. 14, 2012.
Claim Chart comparing Claims 1-26 of U.S. Patent No. 7,749,111 to the disclosure of Hying in view of McGinniss and the knowledge of a person of ordinary skill in the art.
Claim Chart comparing Claims 1-26 of U.S. Patent No. 7,749,111 to the disclosure of Hying in view of Patent Owner's Admissions, Toyomura, Duchateau, and the knowledge of a person of ordinary skill in the art.
Claim Chart comparing Claims 1, 5-12, 17, 18, 24 and 25 of U.S. Patent 8,033,935 to the disclosure of the Patent Owner's Admitted prior art and the knowledge of a person of ordinary skill in the art.
Claim Chart comparing Claims 1-30 of U.S. Patent 8,033,935 to the disclosure of Hying in view of Patent Owner's Admissions, Toyomura, Duchateau, and the knowledge of a person of ordinary skill in the art.
Claim Chart comparing Claims 1, 5-10, 13 and 14 of U.S. Patent No. 8,038,550 to the disclosure of Patent Owner's Admitted prior art and the knowledge of a person of ordinary skill in the art.
Claim Chart comparing Claims 1-18 of U.S. Patent No. 8,038,550 to the disclosure of Hying in view of McGinniss and the knowledge of a person of ordinary skill in the art.
Claim Chart comparing Claims 1-18 of U.S. Patent No. 8,038,550 to the disclosure of Hying in view of Patent Owner's Admissions, Toyomura, Duchateau, and the knowledge of a person of ordinary skill in the art.
Expert Declaration of Dr. Maureen Reitman with Exhibits: Exhibit A: CV of Dr. Maureen Reitman; Exhibit B: U.S. Patent No. 3,836,227 to Holmen; Exhibit C: Potters Industries, Inc. Spheriglass Technical Data Sheet; Exhibit D: U.S. Patent No. 4,857,131 to Damico; Exhibit E: U.S. Patent No. 5,569,689 to Stein; Exhibit F: Dow Corning Data Sheet (Q3-6093).
Potters Industries, Inc. Spheriglass Technical Data Sheet.
Dow Corning Data Sheet (Q3-6093).
First Amended Complaint for Patent Infringement, *Lifetime Products, Inc.* v. *Russell Brands, LLC, D/B/A/ Spalding*, Case No. 1:12-cv-00026-DN (C.D. Utah), filed Feb. 10, 2012.
Notice of Assignment of Inter Parties Reexamination Request for U.S. Patent No. 8,033,935 (Reexam Control No. 95/002,381) issued by the USPTO on Oct. 10, 2012.
Office Action dated Mar. 2, 2012 from U.S. Appl. No. 13/275,174.
Order Granting Request for Ex Parte Reexamination for Reexam Control No. 90/012,654 dated Nov. 7, 2012.
Order Granting Request for Inter Partes Reexamination for Reexam Control No. 95/002,377 dated Nov. 9, 2012.
Order Granting Request for Inter Partes Reexamination for Reexam Control No. 95/002,381 dated Nov. 9, 2012.
Office Action for Inter Partes Reexamination Control No. 95/002,377 dated Nov. 9, 2012.
Office Action for Inter Partes Reexamination Control No. 95/002,381 dated Nov. 9, 2012.
Patent Owner's Preliminary Infringement Contentions dated Feb. 15, 2013.
Third Party Requestor's Motion to Stay and Memorandum in Support of Motion dated Dec. 11, 2012.
Patent Owner's Response in Opposition to Motion to Stay Redacted—nonconfidential dated Jan. 11, 2013.
Third Party Requestor's Reply to Patent Owner's Response to Motion to Stay dated Jan. 17, 2013.
District Court's Minute Order Denying Motion to Stay dated Jan. 31, 2013.
U.S. Appl. No. 09/628,604, filed Jul. 1, 2000, Stevens.
3-M Data Sheet—www.3m.com/market/industrial/additives/perfen.sub.--1.html—p. 1-9, Dec. 1998.
3-M Data Sheet—www.3m.com/market/industrial/ap-pguide.html--pg. 1-2--zeeos.sub.--1.html—p. 1-13, Mar. 28, 2001.
GE Data Sheet—www.gesilicons.com/usadatasheets/1717.html—p. 1-5, Mar. 23, 2001.
Speriglass datasheet www.pottersbeads.com—8 pages—2003.
Web Page downloaded on Jun. 24, 2005, Ichemco, www.ichemco.it/ENG/tab/siliconepsa.asp, 1 page.
"Preliminary Product Data Sheet D-1-SA 210 Silicone Elastomeric Adhesive," Product Information Brochure, General Electric, 3 pages, 1994.
"SS4004, SS4044, and SS4179 Silicone Primers for use with One-Component RTV Silicone Adhesive Sealants," Product Information Brochure, General Electric, 2 pages, 1992.
"D1-SEA213B 2-Component Condensation Cure RTV," Product Information Brochure, General Electric, 7 pages, Apr. 21, 1998.
"SSS4179 Silicone Primer," Product Information Brochure, General Electric, 8 pages, Apr. 21, 1998.
"Information About Specialty Materials for High Technology Applications," Product Information Brochure, Dow Corning, 2 pages, 1987.
Office Action from U.S. Appl. No. 12/828,643 dated Oct. 21, 2010.
Office Action from U.S. Appl. No. 12/828,660 dated Oct. 21, 2010.
Decision on Appeal from U.S. Appl. No. 09/228,325 dated Apr. 27, 2010.
Decision of Appeal from U.S. Appl. No. 09/228,325 dated Mar. 27, 2003.

(56) References Cited

OTHER PUBLICATIONS

*Lifetime Products, Inc.* v. *Russell Brands, LLC, d/b/a/ Spaulding*, Civil Action No. 1:12-cv-00026-DN, Defendant's Motion to Stay and Memorandum in Support of Motion, filed Dec. 11, 2012.
*Lifetime Products, Inc.* v. *Russell Brands, LLC, d/b/a/ Spaulding*, Civil Action No. 1:12-cv-00026-DN, Proposed Order to Stay Litigation Pending Reexamination Proceedings, filed Dec. 11, 2012.
*Lifetime Products* v. *Russell Brands*, Case 1:12CV0026, Reporter's Transcript of Proceedings (Stay Denied), dated Jan. 31, 2013.
Third Party Requester's Comments to Patent Owner's Response for U.S. Patent 7,749,111 dated Mar. 11, 2013.
Third Party Requester's Comments to Patent Owner's Response for U.S. Patent 8,038,550 dated Mar. 11, 2013.
Third Party Requester's Comments to Patent Owner's Response for U.S. Patent 8,033,935 dated Mar. 11, 2013.
Supplemental Declaration of Dr. Maureen Reitman for U.S. Patent No. 7,749,111, dated Mar. 7, 2013.
Supplemental Declaration of Dr. Maureen Reitman for U.S. Patent No. 8,038,550, dated Mar. 7, 2013.
Supplemental Declaration of Dr. Maureen Reitman for U.S. Patent No. 8,033,935, dated Mar. 7, 2013.
Declaration of Mr. Ronald White for U.S. Patent No. 7,749,111, dated Mar. 7, 2013.
Declaration of Mr. Ronald White for U.S. Patent No. 8,038,550, dated Mar. 7, 2013.
Declaration of Mr. Ronald White for U.S. Patent No. 8,033,935, dated Mar. 7, 2013.
Russell Brands, LLC's Preliminary Invalidity Contentions, dated Apr. 5, 2013.
Appendix I to Russell Brands, LLC's Preliminary Invalidity Contentions, dated Apr. 5, 2013: Listing Claim Limitations and Exemplary References Available for Combination to Render Each Such Limitation Obvious.
Exhibit A to Russell Brands, LLC's Preliminary Invalidity Contentions, dated Apr. 5, 2013: Preliminary Invalidity Contentions for U.S. Patent 7,749,111: U.S. Patent No. 5,839,982 Filed Nov. 1, 1996, Issued Nov. 24, 1998 ("Hying") Alone and in Combination with Various Adhesive References.
Exhibit B to Russell Brands, LLC's Preliminary Invalidity Contentions, dated Apr. 5, 2013: Preliminary Invalidity Contentions for U.S. Patent 8,038,550: U.S. Patent No. 5,839,982 Filed Nov. 1, 1996, Issued Nov. 24, 1998 ("Hying") Alone and in Combination with Various Adhesive References.
Exhibit C to Russell Brands, LLC's Preliminary Invalidity Contentions, dated Apr. 5, 2013: Preliminary Invalidity Contentions for U.S. Patent 8,033,935: U.S. Patent No. 5,839,982 Filed Nov. 1, 1996, Issued Nov. 24, 1998 ("Hying") Alone and in Combination with Various Adhesive References.
Exhibit D to Russell Brands, LLC's Preliminary Invalidity Contentions, dated Apr. 5, 2013: Preliminary Invalidity Contentions for U.S. Patent 7,749,111: 1993 Lifetime Double-Sided Tape Backboards Alone and in Combination with Various Adhesive References.
Exhibit E to Russell Brands, LLC's Preliminary Invalidity Contentions, dated Apr. 5, 2013: Preliminary Invalidity Contentions for U.S. Patent 8,038,550: 1993 Lifetime Double-Sided Tape Backboards Alone and in Combination with Various Adhesive References.
Exhibit F to Russell Brands, LLC's Preliminary Invalidity Contentions, dated Apr. 5, 2013: Preliminary Invalidity Contentions for U.S. Patent 8,033,935: 1993 Lifetime Double-Sided Tape Backboards Alone and in Combination with Various Adhesive References.
Exhibit G to Russell Brands, LLC's Preliminary Invalidity Contentions, dated Apr. 5, 2013: Preliminary Invalidity Contentions for U.S. Patent 7,749,111: Huffy Product #7951 SST Acrylic Basketball Backboard (UPC #0 28914 079516) (On Sale at least as early as Mar. 22, 1990) Alone and in Combination with Various Adhesive References.
Exhibit H to Russell Brands, LLC's Preliminary Invalidity Contentions, dated Apr. 5, 2013: Preliminary Invalidity Contentions for U.S. Patent 8,033,935: Huffy Product #7951 SST Acrylic Basketball Backboard (UPC #0 28914 079516) (On Sale at least as early as Mar. 22, 1990) Alone and in Combination with Various Adhesive References.
Exhibit I to Russell Brands, LLC's Preliminary Invalidity Contentions, dated Apr. 5, 2013: Preliminary Invalidity Contentions for U.S. Patent 8,038,550: Huffy Product #7951 SST Acrylic Basketball Backboard (UPC #0 28914 079516) (On Sale at least as early as Mar. 22, 1990) Alone and in Combination with Various Adhesive References.
Exhibit J to Russell Brands, LLC's Preliminary Invalidity Contentions, dated Apr. 5, 2013: Preliminary Invalidity Contentions for U.S. Patent 7,749,111: U.S. Patent No. 5,980,401 Filed Nov. 26, 1997, Issued Nov. 9, 1999 ("Erlewine") Alone and in Combination with Various Adhesive References.
Exhibit K to Russell Brands, LLC's Preliminary Invalidity Contentions, dated Apr. 5, 2013: Preliminary Invalidity Contentions for U.S. Patent 8,038,550: U.S. Patent No. 5,980,401, Filed Nov. 26, 1997, Issued Nov. 9, 1999 ("Erlewine") Alone and in Combination with Various Adhesive References.
Exhibit L to Russell Brands, LLC's Preliminary Invalidity Contentions, dated Apr. 5, 2013: Preliminary Invalidity Contentions for U.S. Patent 8,033,935: U.S. Patent No. 5,980,401 Filed Nov. 26, 1997, Issued Nov. 9, 1999 ("Erlewine") Alone and in Combination with Various Adhesive References.
Exhibit M to Russell Brands, LLC's Preliminary Invalidity Contentions, dated Apr. 5, 2013: Preliminary Invalidity Contentions for U.S. Patent 7,749,111: U.S. Patent No. 4,294,055 Filed Feb. 14, 1997, Issued Oct. 13, 1981 ("Andresen") Alone and in Combination with Various Adhesive References.
Exhibit N To Russell Brands, LLC's Preliminary Invalidity Contentions, dated Apr. 5, 2013: Preliminary Invalidity Contentions for U.S. Patent 8,038,550: U.S. Patent No. 4,294,055 Filed Feb. 14, 1997, Issued Oct. 13, 1981 ("Andresen") Alone and in Combination with Various Adhesive References.
Exhibit O to Russell Brands, LLC's Preliminary Invalidity Contentions, dated Apr. 5, 2013: Preliminary Invalidity Contentions for U.S. Patent 8,033,935: U.S. Patent No. 4,294,055 Filed Feb. 14, 1997, Issued Oct. 13, 1981 ("Andresen") Alone and in Combination with Various Adhesive References.
Exhibit P To Russell Brands, LLC's Preliminary Invalidity Contentions, dated Apr. 5, 2013: Preliminary Invalidity Contentions for U.S. Patent 7,749,111: U.S. Patent No. 6,004,231 Filed Jan. 31, 1996, Issued Dec. 21, 1999 ("Schickert") Alone and in Combination with Various Adhesive References.
Exhibit Q to Russell Brands, LLC's Preliminary Invalidity Contentions, dated Apr. 5, 2013: Preliminary Invalidity Contentions for U.S. Patent 8,038,550: U.S. Patent No. 6,004,231 Filed Jan. 31, 1996, Issued Dec. 21, 1999 ("Schickert") Alone and in Combination with Various Adhesive References.
Exhibit R to Russell Brands, LLC's Preliminary Invalidity Contentions, dated Apr. 5, 2013: Preliminary Invalidity Contentions for U.S. Patent 8,033,935: U.S. Patent No. 6,004,231 Filed Jan. 31, 1996, Issued Dec. 21, 1999 ("Schickert") Alone and in Combination with Various Adhesive References.
Exhibit S to Russell Brands, LLC's Preliminary Invalidity Contentions, dated Apr. 5, 2013: Preliminary Invalidity Contentions for U.S. Patent 7,749,111: U.S. Patent No. 4,377,283 Filed Mar. 24, 1981, Issued Mar. 22, 1983 ("Mahoney") Alone and in Combination with Various Adhesive References.
Exhibit T to Russell Brands, LLC's Preliminary Invalidity Contentions, dated Apr. 5, 2013: Preliminary Invalidity Contentions for U.S. Patent 8,038,550: U.S. Patent No. 4,377,283 Filed Mar. 24, 1981, Issued Mar. 22, 1983 ("Mahoney") Alone and in Combination with Various Adhesive References.
Exhibit U to Russell Brands, LLC's Preliminary Invalidity Contentions, dated Apr. 5, 2013: Preliminary Invalidity Contentions for U.S. Patent 8,033,935: U.S. Patent No. 4,377,283 Filed Mar. 24, 1981, Issued Mar. 22, 1983 ("Mahoney") Alone and in Combination with Various Adhesive References.
Exhibit V to Russell Brands, LLC's Preliminary Invalidity Contentions, dated Apr. 5, 2013: Preliminary Invalidity Contentions for U.S.

(56) References Cited

OTHER PUBLICATIONS

Patent 7,749,111: U.S. Patent No. 4,478,415 Filed Jul. 13, 1982, Issued Oct. 23, 1984 (Shaffer) Alone and in Combination with Various Adhesive References.
Exhibit W to Russell Brands, LLC's Preliminary Invalidity Contentions, dated Apr. 5, 2013: Preliminary Invalidity Contentions for U.S. Patent 8,038,550: U.S. Patent No. 4,478,415 Filed Jul. 13, 1982, Issued Oct. 23, 1984 (Shaffer) Alone and in Combination with Various Adhesive References.
Exhibit X to Russell Brands, LLC's Preliminary Invalidity Contentions, dated Apr. 5, 2013: Preliminary Invalidity Contentions for U.S. Patent 8,033,950: U.S. Patent No. 4,478,415 Filed Jul. 13, 1982, Issued Oct. 23, 1984 (Shaffer) Alone and in Combination with Various Adhesive References.
Exhibit Y to Russell Brands, LLC's Preliminary Invalidity Contentions, dated Apr. 5, 2013: Preliminary Invalidity Contentions for U.S. Patent 7,749,111: U.S. Patent 5,713,806 Filed Jan. 10, 1997, Issued Feb. 3, 1998 (Teitgen) Alone and in Combination with Various Adhesive References.
Exhibit Z to Russell Brands, LLC's Preliminary Invalidity Contentions, dated Apr. 5, 2013: Preliminary Invalidity Contentions for U.S. Patent 8,038,550: U.S. Patent 5,713,806 Filed Jan. 10, 1997, Issued Feb. 3, 1998 (Teitgen) Alone and in Combination with Various Adhesive References.
Exhibit AA to Russell Brands, LLC's Preliminary Invalidity Contentions, dated Apr. 5, 2013: Preliminary Invalidity Contentions for U.S. Patent 8,033,935: U.S. Patent 5,713,806 Filed Jan. 10, 1997, Issued Feb. 3, 1998 (Teitgen) Alone and in Combination with Various Adhesive References.
Exhibit BB to Russell Brands, LLC's Prelimiary Invalidity Contentions, dated Apr. 5, 2013: Preliminary Invalidity Contentions for U.S. Patent 7,749,111: U.S. Patent 5,254,062 Filed Oct. 27, 1992, Issued Oct. 19, 1993 ("Hoffman") Alone and in Combination with Various Adhesive References.
Exhibit CC to Russell Brands, LLC's Preliminary Invalidity Contentions, dated Apr. 5, 2013: Preliminary Invalidity Contentions for U.S. Patent 8,038,550: U.S. Patent 5,254,062 Filed Oct. 27, 1992, Issued Oct. 19, 1993 ("Hoffman") Alone and in Combination with Various Adhesive References.
Exhibit DD to Russell Brands, LLC's Preliminary Invalidity Contentions, dated Apr. 5, 2013: Preliminary Invalidity Contentions for U.S. Patent 8,033,935: U.S. Patent 5,254,062 Filed Oct. 27, 1992, Issued Oct. 19, 1993 ("Hoffman") Alone and in Combination with Various Adhesive References.
Exhibit EE to Russell Brands, LLC's Preliminary Invalidity Contentions, dated Apr. 5, 2013: Preliminary Invalidity Contentions for U.S. Patent 7,749,111: U.S. Patent 5,677,896 Filed Jul. 23, 1996, Issued Oct. 14, 1997 ("Nunes") Alone and in Combination with Various Adhesive References.
Exhibit FF to Russell Brands, LLC's Preliminary Invalidity Contentions, dated Apr. 5, 2013: Preliminary Invalidity Contentions for U.S. Patent 8,038,550: U.S. Patent 5,677,896 Filed Jul. 23, 1996, Issued Oct. 14, 1997 ("Nunes") Alone and in Combination with Various Adhesive References.
Exhibit GG to Russell Brands, LLC's Preliminary Invalidity Contentions, dated Apr. 5, 2013: Preliminary Invalidity Contentions for U.S. Patent 8,033,935: U.S. Patent 5,677,896 Filed Jul. 23, 1996, Issued Oct. 14, 1997 ("Nunes") Alone and in Combination with Various Adhesive References.
Exhibit HH to Russell Brands, LLC's Preliminary Invalidity Contentions, dated Apr. 5, 2013: Preliminary Invalidity Contentions for U.S. Patent 7,749,111: U.S. Patent 5,507,484 Filed Jul. 15, 1994, Issued Apr. 16, 1996 ("van Nimwegen") Alone and in Combination with Various Adhesive References.
Exhibit II to Russell Brands, LLC's Preliminary Invalidity Contentions, dated Apr. 5, 2013: Preliminary Invalidity Contentions for U.S. Patent 8,038,550: U.S. Patent 5,507,484 Filed Jul. 15, 1994, Issued Apr. 16, 1996 ("van Nimwegen") Alone and in Combination with Various Adhesive References.
Exhibit JJ to Russell Brands, LLC's Preliminary Invalidity Contentions, dated Apr. 5, 2013: Preliminary Invalidity Contentions for U.S. Patent 8,033,935: U.S. Patent 5,507,484 Filed Jul. 15, 1994, Issued Apr. 16, 1996 ("van Nimwegen") Alone and in Combination with Various Adhesive References.
Exhibit KK to Russell Brands, LLC's Preliminary Invalidity Contentions, dated Apr. 5, 2013: Preliminary Invalidity Contentions for U.S. Patent 7,749,111: Section 102(G)(2) Prior Art—1996 Adhesive Invetnion as disclosed in Apr. 23, 1996 Memorandum Alone and in Combination with Various Adhesive References.
Exhibit LL to Russell Brands, LLC's Preliminary Invalidity Contentions, dated Apr. 5, 2013: Preliminary Invalidity Contentions for U.S. Patent 8,038,550: Section 102(G)(2) Prior Art—1996 Adhesive Invention as disclosed in Apr. 23, 1996 Memorandum Alone and in Combination with Various Adhesive References.
Exhibit MM to Russell Brands, LLC's Preliminary Invalidity Contentions, dated Apr. 5, 2013: Preliminary Invalidity Contentions for U.S. Patent 8,033,935: Section 102(G)(2) Prior Art—1996 Adhesive Invention as disclosed in Apr. 23, 1996 Memorandum Alone and in Combination with Various Adhesive References.
Skeist, Handbook of Adhesives $2^{nd}$ Ed. (New York: Van Nostrand Reihnhold, 1977) pp. 629, 747, 790-792 including front matter.
U.S. Appl. No. 95/002,381 (Declaration of Richard Hendrickson Under 37 C.F.R. § 1.132 Traversing Grounds of Rejections, filed Feb. 8, 2013).
U.S. Appl. No. 95/002,381 (Declaration of Dr. Dwight Hoffman, filed Feb. 8, 2013).
U.S. Appl. No. 95/002,381 (Declaration of Cliff Holstein Under 37 C.F.R. § 1.132 Traversing Grounds of Rejections, filed Feb. 8, 2013).
U.S. Appl. No. 95/002,381 (Declaration of S. Curtis Nye Under 37 C.F.R. § 1.132 Traversing Grounds of Rejections, filed Feb. 8, 2013).
U.S. Appl. No. 95/002,381 (Declaration of Larry Stevens Under 37 C.F.R. § 1.132 Traversing Grounds of Rejections, filed Feb. 8, 2013).
U.S. Appl. No. 95/002,381 (Declaration of David C. Winter Under 37 C.F.R. § 1.132 Traversing Grounds of Rejections, filed Feb. 8, 2013).
U.S. Appl. No. 09/228,325 (Declaration of Jerry Ward Under 37 C.F.R. § 1.132, filed Sep. 17, 2001, 2013).
Passages from E.M. Petrie, Handbook of Adhesives and Sealants (Washington, D.C.: McGraw Hill), pp. 330, 766 and 781.
Massachusetts Institute of Technology Women's Basketball Record Book, last updated Mar. 10, 2009. Available at http:grfx.cstv.com/photos/schools/mit/sports/w-baskbl/auto_pdf/WomensBasketballRecordBook.pdf (last visited Mar. 3, 2013).
McGraw Hill Construction publication "Acrylic Foam Structural Glaxing Tape: A New Bonding Alternative" May 2007, (last visted Mar. 6, 2013), available at http://continuingeducation.construction.com/article_print.php?L=21&C=222.
Stachiw, Technical Report 1303, Crazing and Degradation of Flexure Strength in Acrylic Plates and a Function of Time (San Diego: Naval Ocean Systems Center, Jun. 1989).
Office Action from U.S. Appl. No. 13/270,149 dated Mar. 25, 2013.
Office Action from U.S. Appl. No. 13/275,174 dated May 9, 2013.
Email from Barbara Russ, Business Manager, MMT Observatory, dated Feb. 27, 2013.
*Lifetime Products, Inc.* v. *Russell Brands, LLC d/b/a Spaulding*: Civil Action No. 1:23-cv-00026-DN, First Amended Complaint for Patent Infringement, filed Feb. 28, 2012.
*Lifetime Products, Inc.* v. *Russell Brands, LLC d/b/a Spaulding*: Civil Action No. 1:23-cv-00026-DN, Answer, Affirmative Defenses, and Counterclaims in Response to First Amended Complaint for Patent Infringement, filed Aug. 6, 2012.
*Lifetime Products, Inc.* v. *Russell Brands, LLC d/b/a Spaulding*: Civil Action No. 1:23-cv-00026-DN, Answer to Counterclaims, filed Aug. 27, 2012.
*Lifetime Products, Inc.* v. *Russell Brands, LLC, d/b/a/ Spaulding*, Civil Action No. 1:12-cv-00026-DN, Plaintiff Lifetime Products, Inc.'s Motion of Expedited Relief Compelling Russell To Remove Confidentiality Designations From Certain Documents and Testimony, Filed Jun. 17, 2013, 18 pages.
*Lifetime Products, Inc.* v. *Russell Brands, LLC, d/b/a/ Spaulding*, Civil Action No. 1:12-cv-00026-DN, Russell Brands, LLC's Opposition to Plaintiff's Motion for Expedited Relief Compelling Russell

(56) References Cited

OTHER PUBLICATIONS

To Remove Confidentiality Designations and Russell's Request For Costs and Attorney Fees, Document 81 Filed Jun. 20, 2013, 20 pages.
Memo—Clement Hying to Dave Allen, Randy Schickert and Bernie Berry, dated Apr. 23, 1996.
Title: 44" Steel Framed Acrylic Update.
Memo—C. Hying to Cost Reduction Committee, Title: Steel Framed Acrylic Cost Reduction, dated May 17, 1996.
Memo—John Cain (Henkel Adhesives) to Dr. Michael Gansow (Huffy), Title: Environmental Testing for Huffy Corp. Bonded Samples, dated May 15, 1996.
Letter—J. Cain (Henkel Adhesives) to B. Berry, Environmental testing report for backboard assembly from Ron Bruno, dated May 29, 1996.
PLEXUS™ Technical Data Sheet for 3940 Low Temperature High Impact Adhesive, Substrate material: PCV, acrylic, date unknown.
PLEXUS™ Bead Length Chart to determine bead length based on bead profile, dated unknown.
Memo—C. Hying to Cost Reduction Committee, Title: Steel Framed Acrylic Cost Reduction, dated Jul. 23, 1996.
Capital Appropriation Request prepared by Ron White, T. Grinwald and Peter Skaalen, dated Apr. 20, 1998.
Letter—Don Graber (President and CEO, Huffy) to Vendors, Requesting 5% cost reduction, dated Aug. 25, 1998.
Huffy Sports Basketball Systems Product Engineering & Technology, Title: Engineering Technology Update "Looking to the Future," dated Oct. 1998.
Letter—Dennis Christensen (LCC/Dispensit) to T. Grinwald, dated Dec. 22, 1998.
Huffy Sports Basketball Systems Product Engineering & Technology, Title: Engineering Technology Update "Looking to the Future," dated Feb. 19, 1999.
Letter—Greg Reese (Robotics Inc.) to T. Grinwald, dated Feb. 3, 1999.
Project Submitted by T. Grinwald, "Critical Project Details Change Steel Framed Acrylics From Taped Assembly to Adhesive Assembly," dated Mar. 16, 1999.
Project Submitted by T. Grinwald, "Critical Project Details Lighted Backboard & Rim—NCAA Version," dated Mar. 16, 1999.
Memo—T. Grinwald to Dave Caschera (Huffy Sports), Title: Polyethylene Adhesive Sample, dated Mar. 19, 1999.
Letter—Marianne Stroup (GE) to Jeff Brietzman (Huffy), Title: GE/Huffy Confidentiality Agreement, dated Apr. 8, 1999.
Confidentiality Agreement—GE and Huffy Sports, dated Apr. 12, 1999.
Letter—Rick Pearce (GE) to T. Grinwald, Results from adhesive performed by Dave Caschera on acrylic and metal frame combinations using several different primer and dry time combinations, dated May 12, 1999.
Bid from AQUASPAN for polypropylene goal mounts, May 11, 1999.
Midnight Madness Lighted Backboard Cost Breakdown, dated May 24, 1999.
Letter—ELS to T. Grinwald, Cost for GE-RTV-5243, dated May 27, 1999.
Fax—Natural Cure, One-Component RTV Adhesive Sealants data sheet, dated May 18, 1999.
Marketing Plan—Night Games Lighted Backboard, dated May 27, 1999.
Quote—XL Engineering to Huffy, Title: Glue Machine Fixtures, design and build two fixtures to be used on the backboard gluing machine, dated May 3, 1999.
Capital Appropriation Request prepared by T. Grinwald and Kathryn Ciulik, Title: "Night Games Night Games lighted backboard and rim utilizes patented technology to light the backboard and rim Night Games backboard and rim enables the user to extend play hours into dusk." dated May 27, 1999.
Project Part Tracking—development Thu Pilot & Initial Production, GE #5234 RTV Adhesive used for Night Games backboard assembly, dated Jun. 4, 1999.

Letter—Nordson Corporation to T. Grinwald, dated Jun. 17, 1999.
Letter—R. White to Chilton Products, Title: 44"/54" Blowmolded Acrylic Backboards, dated Sep. 29, 1999.
Quote—ELS to T. Grinwald, Quote for GE-RTV-5242 and GE-RTV-5243, dated Oct. 22, 1999.
Letter—Scott Carmichael (Ward Adhesives) to T. Grinwald, dated Jan. 31, 2000.
Letter—S. Carmichael (Ward Adhesives) to T. Grinwald, Quote for ISR 70-08 KD, dated Aug. 15, 2000.
Email—Kurt Limburg to Rebecca Kerschinske, P. Skaalen, Nile Fritz, Larry Gutrod, 54" SFA, dated Jun. 26, 2000.
Memo—Kurt Limberg, Title: Costco 54" SFA 1"X1" Square Corners, Cost estimate for taped backboard, dated Jul. 21, 2000.
Project Submitted by Scott Roth, "Running change to [convert] all SFA boards from double-sided tape to robotic applied adhesive, Effectivity date of Oct. 1, 2000," dated Aug. 8, 2000.
Item Master Inquiry, Adhesive MS Polymer ISR 70-08, dated Mar. 6, 2013.
Routing/Bill of Materials for different types of boards, dated Sep. 5, 2000.
De-designated and Redacted Deposition Testimony by Ronald White, 112 pages.
Hussey, B. Structural Adhesivies: Directory and Databook, Chapman & Hall (1996).
Kinloch, A.J., Adhesion and Adhesives: Science and Technology, Chapman & Hall (1987).
3M™ Microspheres: Performance Enhancements: 3M™ Microspheres engineered for a wide choice of unique enhancements, No. 98-0212-0312-4 (Jan. 1998).
Troughton, M.J. Handbook of Plastics Joining: A Practical Guide (1st ed.) pp. 137-163 ("Chemical Bonding—Adhesive and Solvent Bonding").
C.W. Jennings (1972) "Surface Roughness and Bond Strength of Adhesives," Journal of Adhesives 4:1 pp. 25-38.
Bill of Materials for #7951 Showing Dates of Use for Material ("BOM").
Huffy Sports Drawing No. 203275, Rev. 2 (Feb. 16, 1990, last rev'd Feb. 22, 1991).
Huffy Sports Drawing No. 203323, Rev. 4 (Feb. 22, 1990, last rev'd Mar. 23, 1993).
Huffy Sports Drawing No. 209079, Rev. 3 (Feb. 14, 1990, last rev'd Oct. 14, 1991).
Spheriglass Solid Glass Spheres: Space Application Glass Beads Data Sheet (product advertisement).
GE Silicones (1994) "Preliminary Product Data Sheet."
Capital Appropriation Request, 48' Blowmolded Composite Frame Acrylic Backboard, Request Prepared by RonWhite, dated Dec. 21, 2000.
Project 2416—Misc. Change—New Robot Glue, Project submitted by Carrie Vissers on Jan. 22, 2003.
Third Party Requester's Comments to Patent Owner's Comments of Jul. 31, 2013 Pursuant to 37 C.F.R. § 1.951, Control No. 95/002,377, U.S. Patent 8,038,550, dated Aug. 29, 2013.
Exhibit A to Third Party Requester's Comments to Patent Owner's Comments of Jul. 31, 2013 Pursuant to 37 C.F.R. § 1.951, Control No. 95/002,377, U.S. Patent 8,038,550, dated Aug. 29, 2013.
Exhibit B to Third Party Requester's Comments to Patent Owner's Comments of Jul. 31, 2013 Pursuant to 37 C.F.R. § 1.951, Control No. 95/002,377, U.S. Patent 8,038,550, dated Aug. 29, 2013.
Exhibit C to Third Party Requester's Comments to Patent Owner's Comments of Jul. 31, 2013 Pursuant to 37 C.F.R. § 1.951, Control No. 95/002,377, U.S. Patent 8,038,550, dated Aug. 29, 2013.
Exhibit D to Third Party Requester's Comments to Patent Owner's Comments of Jul. 31, 2013 Pursuant to 37 C.F.R. § 1.951, Control No. 95/002,377, U.S. Patent 8,038,550, dated Aug. 29, 2013.
Exhibit E to Third Party Requester's Comments to Patent Owner's Comments of Jul. 31, 2013 Pursuant to 37 C.F.R. § 1.951, Control No. 95/002,377, U.S. Patent 8,038,550, dated Aug. 29, 2013.
Exhibit F to Third Party Requester's Comments to Patent Owner's Comments of Jul. 31, 2013 Pursuant to 37 C.F.R. § 1.951, Control No. 95/002,377, U.S. Patent 8,038,550, dated Aug. 29, 2013.

(56) References Cited

OTHER PUBLICATIONS

Exhibit G to Third Party Requester's Comments to Patent Owner's Comments of Jul. 31, 2013 Pursuant to 37 C.F.R. § 1.951, Control No. 95/002,377, U.S. Patent 8,038,550, dated Aug. 29, 2013.
Exhibit H to Third Party Requester's Comments to Patent Owner's Comments of Jul. 31, 2013 Pursuant to 37 C.F.R. § 1.951, Control No. 95/002,377, U.S. Patent 8,038,550, dated Aug. 29, 2013.
Exhibit I to Third Party Requester's Comments to Patent Owner's Comments of Jul. 31, 2013 Pursuant to 37 C.F.R. § 1.951, Control No. 95/002,377, U.S. Patent 8,038,550, dated Aug. 29, 2013.
Exhibit J to Third Party Requester's Comments to Patent Owner's Comments of Jul. 31, 2013 Pursuant to 37 C.F.R. § 1.951, Control No. 95/002,377, U.S. Patent 8,038,550, dated Aug. 29, 2013.
Response to Defective Paper in Inter Partes Reexamination Control No. 95/002,377, filed on Sep. 29, 2013.
Office Action from Reexamination Control No. 90/012,654 dated Sep. 30, 2013.
*Lifetime Products, Inc.* v. *Russell Brands, LLC d/b/a Spaulding*, Russell Brands, LLC's Reply in Support of its Renewed Motion to Stay, Case No. 1:12-cv-00026-DN, dated Jul. 24, 2013.
*Lifetime Products, Inc.* v. *Russell Brands, LLC d/b/a Spaulding*, Lifetime's Brief in Opposition to Russell's Renewed Motion to Stay, Case No. 1:12-cv-00026-DN, dated Jul. 19, 2013.
*Lifetime Products, Inc.* v. *Russell Brands, LLC d/b/a Spaulding*, Russell Brands, LLC's Renewed Motion to Stay and Memorandum is Support, Case No. 1:12-cv-00026-DN, dated Jul. 5, 2013.
De-designated and Redacted Deposition Testimony by Paul Michael Sullivan, dated Jul. 11, 2013.
De-designated and Redacted Deposition Testimony by Ronald White, dated Jun. 14, 2013.
De-designated and Redacted Deposition Testimony by Doug Sims, dated Jun. 12, 2013.
Ex Parte Interview Summary, dated Jun. 27, 2013, from Reexamination Control No. 90/012,654 for U.S. Patent No. 7,749,111.
Deposition of Maureen Reitman, dated Jul. 2, 2013.

* cited by examiner

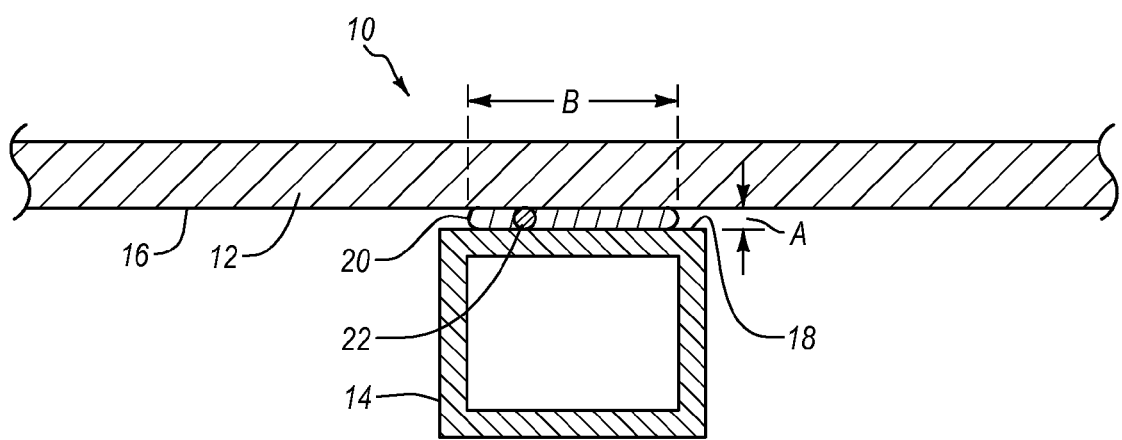

BASKETBALL BACKBOARD

CROSS-REFERENCE TO RELATED APPLICATIONS

This application is a continuation of U.S. patent application Ser. No. 12/828,643, filed on Jul. 1, 2010, now U.S. Pat. No. 8,033,935; which is a continuation of U.S. patent application Ser. No. 09/228,325, filed on Jan. 11, 1999, now U.S. Pat. No. 7,749,111. These applications and patents are incorporated by reference in their entireties.

FIELD OF THE INVENTION

The present invention relates to a system and method for bonding an acrylic surface to a frame. More particularly, the present invention is directed to a system and method for adhesively bonding an acrylic basketball backboard to a frame structure.

BACKGROUND

As the game of basketball has increased in popularity, a greater number of people have purchased basketball systems for use at their homes. Such basketball systems typically comprise at least a pole to which a backboard and a goal is secured so that the goal is suspended above a playing surface. The basketball backboard can be made of a variety of materials including various polymers and composites. Clear acrylic backboards are becoming increasingly popular because they resemble professional backboards.

There are several problems which must be overcome to successfully use an acrylic basketball backboard. First, the backboard must be adequately bonded to a support frame. Second, there must be sufficient flexibility in the bond to dissipate the impact energy from the backboard to the frame. If the bond between the backboard and frame is too rigid, then the backboard can fracture. If the bond is too loose, then the adhesion fails.

One successful resolution of this problem has been the use of two-sided tape having a foam center. One suitable tape, known as "VHB" tape, is commercially available from 3M and Norton. The tape is typically applied to the frame structure, and then the acrylic backboard is pressed on the taped frame.

A significant problem with the use of the two-sided tape described above is the time and labor required to apply the tape to the frame. Currently, substantial manual labor is used to prepare the acrylic backboard surface and frame surface to receive the adhesive tape, to manually lay the tape, and to press the taped backboard and frame together. It would be a substantial improvement in the art to automate the labor-intensive steps in assembly of an acrylic basketball backboard.

Such an automated system and method for bonding an acrylic surface to a frame is disclosed and claimed herein.

SUMMARY OF THE INVENTION

The present invention relates to an acrylic basketball backboard assembly and to a method of bonding an acrylic basketball backboard to a frame structure. The assembly includes a basketball backboard frame structure and an acrylic backboard which are bonded together with a suitable elastomeric adhesive. Silicone adhesive is currently preferred because of its excellent adhesion and flexibility and low cost. The elastomeric adhesive replaces conventional VHB double-sided tape. Applying adhesive to either the backboard or frame structure can be automated and performed by commercially available robotic equipment, thereby improving the efficiency and cost of the basketball backboard assembly process.

A significant problem with most elastomeric adhesives is the long cure time. This problem was solved according to the present invention by using a catalyzed adhesive. The amount of cure catalyst used can vary to provide an optimum set time. Currently, the adhesive is configured to provide a set time in the range from about 5 minutes to 1 hour, and more preferably from about 7 to 15 minutes.

Another problem with elastomeric adhesives was the need to provide controlled and reproducible adhesion and flexibility of the adhesive bond. It was observed that the bond gap directly affected adhesion and flexibility. For example, if the bond gap was too great, good flexibility was observed at the expense of adhesion, with cohesive failure occurring. If the bond gap was too little, good adhesion was obtained at the expense of flexibility. Thus, there was a need to control the bond gap. The currently preferred adhesive bond gap is in the range from about 2 to 2.5 mm.

The bond gap is preferably controlled according to the present invention by including a plurality of bond gap spacers within the adhesive bond. The bond gap spacers are positioned between the frame bonding surface and the backboard bonding surface to provide the bond gap. A variety of different bond gap spacers can be used according to the present invention. Spherical beads, such as glass microspheres, are currently preferred.

DESCRIPTION OF THE DRAWINGS

FIG. 1 is a cross-sectional view of an acrylic backboard bonded to a frame structure.

DESCRIPTION OF THE INVENTION

The present invention is directed to an acrylic basketball backboard assembly and to a method of bonding an acrylic basketball backboard to a frame structure. FIG. 1 shows cross-sectional view of a cut-away portion of an acrylic basketball backboard assembly 10. The backboard assembly 10 includes an acrylic backboard 12 bonded to a frame structure 14. The backboard 12 includes a backboard bonding surface 16, and the frame structure 14 includes a frame bonding surface 18. An elastomeric adhesive 20 is sandwiched between the two bonding surfaces 16 and 18. The elastomeric adhesive 20 replaces the VHB double-sided tape currently used with acrylic backboards.

After testing a large number of different elastomeric adhesives from different suppliers, silicone adhesive was preferred because it provides a bond of sufficient strength and flexibility, comparable to that obtained with conventional foam filled, two-sided tape. It was also preferred because of its low cost and availability. Other adhesives, such as urethane, polyurethane, hot melt adhesives, methylmethacrylate, and cyanoacrylate adhesives did not perform as well as silicone in providing the desired balance between bond strength and flexibility and/or were more expensive. Although other elastomeric adhesives can be made suitable for use in the present invention, silicone adhesive is currently preferred and will be discussed below.

Suitable silicone adhesive has been obtained from General Electric (D1-SEA 210) and from Dow Corning (Q3-6093). The commercially available silicone adhesive includes dimethylpolysiloxane as a primary ingredient, with N-propylsilicate, aminopropyltriethoxysilane, 1,3,5-tris(trimethoxysilyl-propylisocyanurate) as minor ingredients.

In a currently preferred embodiment, the silicone adhesive has a bond gap (labeled "A" in FIG. 1) in the range from about 2 to 2.5 mm (0.08 to 0.1 inch). If the bond gap is too small, there is not sufficient flexibility in the bond to dissipate the impact energy from the backboard created when the basketball strikes the backboard. The bond between the backboard and frame is too rigid, and the backboard tends to fracture. If the bond gap is too great, there is good flexibility, but the bond is not strong enough. Adhesion failure occurs within the silicone adhesive itself and not at the bond interface with the backboard or frame.

To provide the currently preferred adhesive bond gap, bond gap spacers 22 are located between the frame bonding surface and the backboard bonding surface. Suitable spacers can be any rigid structure having the desired thickness which can maintain the gap between the frame and backboard bonding surfaces. Currently preferred bond gap spacers include spherical beads, and more preferably glass microspheres. Glass microspheres having a diameter in the range from about 2 to 2.5 mm (0.08 to 0.1 inch) function very well. Other bond gap spacers which have been used successfully include weed trimmer line and plastic beads.

One problem with conventional single stage silicone adhesive is its long cure time, typically about 24 hours or more. If the cure time is too great, then an undue amount of manufacturing space is required to store the backboard assemblies while they cure. This problem was solved according to the present invention by using a catalyzed silicone adhesive. Typical commercially available catalyzed silicone adhesives contain two parts: (1) the adhesive itself and (2) a separate catalyst which is mixed with the adhesive to initiate curing. The ratio of catalyst to adhesive is preferably combined to provide a set time in the range from 5 minutes to 1 hour, and more preferably a set time in the range from about 7 to 15 minutes. The set time is defined as the time at which the adhesive sets sufficiently to enable the backboard assembly to be moved and handled.

The present invention also includes a method of bonding an acrylic basketball backboard to a frame structure. The method can be automated and performed by a suitable robotic device, thereby substantially reducing the assembly time and manual labor previously required to prepare acrylic backboard assemblies.

In the method according to the present invention, the backboard and frame bonding surfaces are preferably prepared to receive the elastomeric adhesive. For the frame structure, this is typically performed by roughening the surface. For instance, the surface can be roughened by rubbing a scouring pad, of the type commonly found in kitchens, over the surface. The backboard frame structure is typically painted metal. The paint is preferably a powder coated paint composition.

For the acrylic surface, it must be chemically treated to break the surface tension of the acrylic surface. Although the treatment will vary depending on the adhesive used, it typically will include a chemical mixture of acetone and the adhesive itself. The appropriate acrylic surface preparation is usually provided by the supplier of the elastomeric adhesive.

It has been found that when the acrylic backboard bonding surface contains a printed image, the printing itself provides an adequate surface preparation for the elastomeric adhesive such that a separate backboard surface preparation step is not necessary.

In the method of bonding an acrylic basketball backboard to a frame structure, the elastomeric adhesive can be applied to either the acrylic backboard or frame structure bonding surface. For example, if the adhesive is applied to the bonding surface of the acrylic backboard, then the frame structure is placed against the backboard such that the bonding surface of the frame structure contacts the adhesive. Alternative, if the adhesive is applied to the bonding surface of the frame structure, then the acrylic backboard is placed against the frame structure such that the bonding surface of the backboard contacts the adhesive.

In either case, a predetermined bond gap is maintained between the backboard bonding surface and the frame bonding surface. As discussed above, the bond gap is important to achieving a suitable balance between adhesion and flexibility. The method can include the step of positioning a plurality of bond gap spacers between the frame bonding surface and the backboard bonding surface to provide the desired adhesive bond gap. The bond gap spacers preferably provide a bond gap in the range from about 2 to 2.5 mm (0.08 to 0.1 inch). Suitable bond gap spacers comprise spherical beads, such as glass microspheres, or other structures which are compatible with the adhesive. Glass microspheres are currently preferred because they are easily dispensed using an automated dispensing device. Furthermore, when silicone adhesive is used, the glass microspheres bond to the adhesive.

The elastomeric adhesive is allowed to cure. A catalyzed adhesive can be used to tailor the set time for elastomeric adhesives.

As discussed above, the method includes the step of preparing the frame structure bonding surface and the acrylic backboard bonding surface to receive the elastomeric adhesive. For the frame structure, this is usually a roughening of the surface. For the acrylic backboard, this is usually a chemical treatment specifically formulated for the adhesive being used. However, the step of preparing the acrylic backboard bonding surface to receive the adhesive can include printing an image on the bonding surface with an ink which securely bonds to the bonding surface.

Although the bond width (labeled "B" in FIG. 1) is not critical to the present invention, it is presently preferred to apply the elastomeric adhesive with a bond width in the range from about 1 cm to 2 cm.

To evaluate various elastomeric adhesives, a standard test was developed to measure adhesion and flexibility. A baseline was obtained based upon the currently used double-sided VHB tape available from 3M and Norton. A digital level was used to measure flexibility, and a torque wrench was used to test adhesion.

Test specimens consisted of a 3-inch by 6-inch piece of acrylic and a 6-inch long powder coated 1-inch by 1-inch tubing to simulate a backboard frame. The acrylic and tubing were prepped to receive the double-sided VHB tape. Ten specimens were prepared using 3M brand VHB tape, and ten specimens were prepared using Norton brand VHB tape. The test pieces were centered and bonded with the tape and ran through a compaction roller, to simulate conventional acrylic backboard assembly. The test pieces were allowed to sit 24 hours. The electronic level and torque wrench were then used to obtain a degree of deflection and a torque force at failure. The type of failure was also noted: either cohesive failure (tape fails with adhesion to both substrate), acrylic failure (acrylic does not adhere), and powder coat failure (powder coat does not adhere). All VHB tapes pieces showed cohesive failure.

All twenty tests were averaged to establish a baseline for elastomeric adhesives to meet or exceed. The baseline was a 20° deflection at 125 inch-pounds torque.

Various elastomeric adhesives were tested from the following manufacturers: Ashland, Ciba-Giga, Dapp, Devcon, Dow Corning, Elsworth, General Electric, Goop, Hysol, H.B. Fuller, and Resin Tech Group. It was found that the catalyzed silicone adhesive having the desired bond gap obtained from 25° to 45° deflection at 160 inch-pounds torque.

It will be appreciated that the present invention provides an acrylic basketball backboard which utilizes an elastomeric adhesive, such as silicone adhesive, to replace the conventional double-sided tape. The elastomeric adhesive provides good adhesion and flexibility. Advantageously, the labor-intensive steps in assembly of an acrylic basketball backboard can be automated using the present invention. Furthermore, the elastomeric adhesive cost can also be less than the cost of the double-sided tape.

The present invention may be embodied in other specific forms without departing from its essential characteristics. The described embodiments are to be considered in all respects only as illustrative and not restrictive. The scope of the invention is, therefore, indicated by the appended claims rather than by the foregoing description.

What is claimed is:

1. A basketball backboard comprising:
   a frame;
   a frame bonding surface;
   a backboard;
   a backboard bonding surface; and
   a single layer of adhesive sandwiched between the frame bonding surface and the backboard bonding surface to directly bond the frame and the backboard, the adhesive directly contacting the frame bonding surface and the backboard bonding surface, the adhesive having sufficient flexibility and adhesion to allow the basketball backboard to be used for playing the game of basketball, the adhesive having sufficient flexibility in the bond to dissipate impact energy from the backboard to the frame when a basketball strikes the backboard when playing the game of basketball.

2. The basketball backboard as in claim 1, further comprising a bond gap between the frame bonding surface and the backboard bonding surface, the bond gap having a size between about 2 mm to about 2.5 mm (0.08 inch to 0.1 inch).

3. The basketball backboard as in claim 2, wherein the bond gap has a width between about 1.0 cm and about 2.0 cm.

4. The basketball backboard as in claim 1, wherein the backboard is constructed from acrylic.

5. The basketball backboard as in claim 1, wherein the backboard is constructed from a polymer material.

6. The basketball backboard as in claim 1, wherein the backboard is constructed from a composite material.

7. The basketball backboard as in claim 1, wherein the adhesive is an elastomeric adhesive.

8. The basketball backboard as in claim 1, wherein the adhesive is a catalyzed adhesive.

9. The basketball backboard as in claim 1, wherein the adhesive is a silicone adhesive.

10. The basketball backboard as in claim 1, wherein the adhesive is a catalyzed silicone adhesive.

11. The basketball backboard as in claim 1, wherein the adhesive is a catalyzed elastomeric adhesive.

12. The basketball backboard as in claim 1, wherein the adhesive provides sufficient flexibility in the bond to dissipate impact energy from the backboard to the frame when a basketball strikes the backboard when playing the game of basketball; and
   wherein the adhesive provides sufficient adhesion to securely connect the backboard and the frame.

13. The basketball backboard as in claim 1, wherein the adhesive is a two-part adhesive comprising an adhesive and a separate catalyst.

14. The basketball backboard as in claim 1, wherein the backboard is constructed from acrylic and the adhesive is a catalyzed elastomeric adhesive.

15. The basketball backboard as in claim 1, wherein the backboard is constructed from a polymer material and the adhesive is a catalyzed elastomeric adhesive.

16. The basketball backboard as in claim 1, wherein the backboard is constructed from a composite material and the adhesive is a catalyzed elastomeric adhesive.

17. The basketball backboard as in claim 1, wherein the adhesive is a non-tape adhesive.

18. A basketball backboard comprising:
   a basketball backboard frame;
   a basketball backboard; and
   a single layer of adhesive of the same material sandwiched between and in contact with each of the basketball backboard frame and the basketball backboard to directly bond the basketball backboard frame and the basketball backboard, the adhesive having sufficient flexibility and adhesion to allow the basketball backboard to be used for playing the game of basketball.

19. The basketball backboard as in claim 18, further comprising a bond gap between the basketball backboard frame and the basketball backboard, the bond gap having a size between about 2 mm to about 2.5 mm (0.08 inch to 0.1 inch).

20. The basketball backboard as in claim 19, wherein the bond gap has a width between about 1.0 cm and about 2.0 cm.

21. The basketball backboard as in claim 18, wherein the basketball backboard is constructed from acrylic.

22. The basketball backboard as in claim 18, wherein the basketball backboard is constructed from a polymer material.

23. The basketball backboard as in claim 18, wherein the basketball backboard is constructed from a composite material.

24. The basketball backboard as in claim 18, wherein the adhesive is an elastomeric adhesive.

25. The basketball backboard as in claim 18, wherein the adhesive is a catalyzed adhesive.

26. The basketball backboard as in claim 18, wherein the adhesive is a silicone adhesive.

27. The basketball backboard as in claim 18, wherein the adhesive is a catalyzed silicone adhesive.

28. The basketball backboard as in claim 18, wherein the adhesive is a catalyzed elastomeric adhesive.

29. The basketball backboard as in claim 18, wherein the adhesive provides sufficient flexibility in the bond to dissipate impact energy from the backboard to the frame when a basketball strikes the backboard when playing the game of basketball; and
   wherein the adhesive provides sufficient adhesion to securely connect the backboard and the frame.

30. The basketball backboard as in claim 18, wherein the adhesive is a two-part adhesive comprising an adhesive and a separate catalyst.

31. The basketball backboard as in claim 18, wherein the backboard is constructed from acrylic and the adhesive is a catalyzed elastomeric adhesive.

32. The basketball backboard as in claim 18, wherein the backboard is constructed from a polymer material and the adhesive is a catalyzed elastomeric adhesive.

33. The basketball backboard as in claim 18, wherein the backboard is constructed from a composite material and the adhesive is a catalyzed elastomeric adhesive.

34. The basketball backboard as in claim 18, wherein the adhesive is a non-tape adhesive.

35. A basketball backboard comprising:
a basketball backboard frame constructed from metal;
a basketball backboard constructed from acrylic; and
a non-tape, elastomeric adhesive in contact with and directly bonding the basketball backboard frame and the basketball backboard, the non-tape, elastomeric adhesive having sufficient flexibility and adhesion to allow the basketball backboard to be used for playing the game of basketball, the non-tape, elastomeric adhesive having sufficient flexibility in the bond to dissipate impact energy from the backboard to the frame when a basketball strikes the backboard when playing the game of basketball.

36. The basketball backboard as in claim 35, wherein the non-tape, elastomeric adhesive is a catalyzed elastomeric adhesive.

37. The basketball backboard as in claim 35, wherein the non-tape, elastomeric adhesive provides sufficient flexibility to dissipate impact energy from the backboard to the frame when a basketball strikes the backboard when playing the game of basketball; and
wherein the non-tape, elastomeric adhesive provides sufficient adhesion to securely connect the backboard and the frame to allow the basketball backboard to be used for playing the game of basketball.

38. The basketball backboard as in claim 35, wherein the non-tape, elastomeric adhesive is a single layer of material; and
wherein the basketball backboard includes an image and at least a portion of the non-tape, elastomeric adhesive is bonded to the image.

39. A basketball backboard comprising:
a basketball backboard frame constructed from metal;
a basketball backboard constructed from a polymer; and
a non-tape, elastomeric adhesive in contact with and directly bonding the basketball backboard frame and the basketball backboard, the non-tape, elastomeric adhesive having sufficient flexibility and adhesion to allow the basketball backboard to be used for playing the game of basketball, the non-tape, elastomeric adhesive having sufficient flexibility in the bond to dissipate impact energy from the backboard to the frame when a basketball strikes the backboard when playing the game of basketball.

40. The basketball backboard as in claim 39, wherein the non-tape, elastomeric adhesive is a catalyzed elastomeric adhesive.

41. The basketball backboard as in claim 39, wherein the non-tape, elastomeric adhesive provides sufficient flexibility to dissipate impact energy from the backboard to the frame when a basketball strikes the backboard when playing the game of basketball; and
wherein the non-tape, elastomeric adhesive provides sufficient adhesion to securely connect the backboard and the frame to allow the basketball backboard to be used for playing the game of basketball.

42. The basketball backboard as in claim 39, wherein the non-tape, elastomeric adhesive is a single layer of material; and
wherein the basketball backboard includes an image and at least a portion of the non-tape, elastomeric adhesive is bonded to the image.

43. A basketball backboard comprising:
a basketball backboard frame;
a basketball backboard; and
a non-tape, elastomeric adhesive in contact with and directly bonding the basketball backboard frame and the basketball backboard, the non-tape, elastomeric adhesive having sufficient flexibility and adhesion to allow the basketball backboard to be used for playing the game of basketball.

44. The basketball backboard as in claim 43, wherein the non-tape, elastomeric adhesive is a single layer of material.

45. The basketball backboard as in claim 43, wherein the non-tape, elastomeric adhesive is a catalyzed adhesive.

46. The basketball backboard as in claim 43, wherein the non-tape, elastomeric adhesive is a silicone adhesive.

47. The basketball backboard as in claim 43, wherein the non-tape, elastomeric adhesive is a catalyzed silicone adhesive.

48. The basketball backboard as in claim 43, wherein the non-tape, elastomeric adhesive provides sufficient flexibility to dissipate impact energy from the backboard to the frame when a basketball strikes the backboard when playing the game of basketball; and
wherein the non-tape, elastomeric adhesive provides sufficient adhesion to securely connect the backboard and the frame to allow the basketball backboard to be used for playing the game of basketball.

49. The basketball backboard as in claim 43, wherein the basketball backboard includes an image and at least a portion of the non-tape, elastomeric adhesive is bonded to the image.

50. The basketball backboard as in claim 43, wherein the non-tape, elastomeric adhesive is a single layer of material;
wherein the basketball backboard includes an image and at least a portion of the non- tape, elastomeric adhesive is bonded to the image;
wherein the non-tape, elastomeric adhesive provides sufficient flexibility to dissipate impact energy from the backboard to the frame when a basketball strikes the backboard when playing the game of basketball; and
wherein the non-tape, elastomeric adhesive provides sufficient adhesion to securely connect the backboard and the frame to allow the basketball backboard to be used for playing the game of basketball.

* * * * *

UNITED STATES PATENT AND TRADEMARK OFFICE
CERTIFICATE OF CORRECTION

| | | |
|---|---|---|
| PATENT NO. | : 8,852,034 B2 | |
| APPLICATION NO. | : 13/270149 | |
| DATED | : October 7, 2014 | |
| INVENTOR(S) | : Larry Stevens | |

It is certified that error appears in the above-identified patent and that said Letters Patent is hereby corrected as shown below:

On the Title Page

On Page 2, in Item (56), under "OTHER PUBLICATIONS", in Column 1, Line 4, delete "BRuss," and insert -- Bruss, --, therefor.

On Page 4, in Item (56), under "OTHER PUBLICATIONS", in Column 1, Line 29, delete "Prelimiary" and insert -- Preliminary --, therefor.

On Page 4, in Item (56), under "OTHER PUBLICATIONS", in Column 2, Line 9, delete "Invetnion" and insert -- Invention --, therefor.

On Page 4, in Item (56), under "OTHER PUBLICATIONS", in Column 2, Line 45, delete "visted" and insert -- visited --, therefor.

On Page 5, in Item (56), under "OTHER PUBLICATIONS", in Column 2, Line 23, delete "Adhesivies:" and insert -- Adhesives: --, therefor.

In the Specification

In Column 2, Line 41, delete "shows" and insert -- shows a --, therefor.

Signed and Sealed this
Third Day of February, 2015

Michelle K. Lee
*Deputy Director of the United States Patent and Trademark Office*